United States Patent [19]

Dijkmans

[11] Patent Number: 4,748,342
[45] Date of Patent: May 31, 1988

[54] POWER SUPPLY CIRCUIT

[75] Inventor: Eise C. Dijkmans, Eindhoven, Netherlands

[73] Assignee: U.S. Philips Corporation, Tarrytown, N.Y.

[21] Appl. No.: 937,592

[22] Filed: Dec. 3, 1986

[30] Foreign Application Priority Data

Dec. 18, 1985 [NL] Netherlands ............ 8503480

[51] Int. Cl.⁴ ............................................. H02J 9/06
[52] U.S. Cl. ....................................... 307/66; 307/64; 307/87; 363/126; 363/127
[58] Field of Search ............. 307/43, 45, 46, 48, 307/49, 58, 63, 64, 66, 70, 71, 82, 85, 86, 87; 363/126, 127

[56] References Cited

U.S. PATENT DOCUMENTS

| | | | |
|---|---|---|---|
| 3,769,571 | 10/1973 | Wilkson | 307/82 X |
| 4,010,381 | 3/1977 | Fichenscher et al. | 307/66 |
| 4,038,559 | 7/1977 | Chun et al. | 307/64 |
| 4,238,691 | 12/1980 | Ebert | 307/66 |
| 4,241,261 | 12/1980 | Ebert | 307/45 |
| 4,313,060 | 1/1982 | Fickenscher et al. | 307/82 X |
| 4,475,047 | 10/1984 | Ebert | 307/87 X |
| 4,510,401 | 4/1985 | Legoult | 307/66 |
| 4,556,802 | 12/1985 | Harada et al. | 307/66 |
| 4,564,767 | 1/1986 | Charych | 307/66 |
| 4,673,825 | 6/1987 | Raddi et al. | 307/87 X |

Primary Examiner—William M. Shoop, Jr.
Assistant Examiner—Paul Ip
Attorney, Agent, or Firm—David R. Treacy; Bernard Franzblau

[57] ABSTRACT

A power supply circuit in which the mains voltage which is applied across the primary winding (2) of a transformer (1) to generate a first direct voltage across a first capacitor ($C_1$) by means of a secondary winding (3) and a first rectifier ($D_1$) and a second direct voltage is generated across a second capacitor ($C_2$) by means of a tertiary winding (4) and a second rectifier ($D_2$). If the mains voltage is not connected, a first direct voltage is supplied by a battery (15) connected in parallel with the first capacitor ($C_1$). The second direct voltage then is generated from the battery voltage of the battery (15) by means of an inverter circuit (20), a transistor ($T_1$), the secondary winding (3) and the the tertiary winding (4).

15 Claims, 4 Drawing Sheets

FIG.8    FIG.9

POWER SUPPLY CIRCUIT

BACKGROUND OF THE INVENTION

This invention relates to a power supply circuit for supplying at least a first direct voltage which can be optionally derived from the alternating voltage of a mains voltage source or from the battery voltage of at least one battery. A circuit for deriving the direct voltage from the alternating voltage is provided with a transformer comprising at least a primary winding having a first and a second connection terminal for connection to the alternating voltage, and a secondary winding which is coupled to first rectifier means provided with a third and a fourth connection terminal for taking off the first direct voltage, a circuit for deriving the first direct voltage from the battery voltage comprises means for connecting the battery between the third and the fourth connection terminal.

A circuit of this type may be used, for example, for the power supply of class-G amplifiers and for the power supply of portable compact disc players.

Electronic circuits may receive their power supply in two ways first, a circuit may receive its power supply from the mains in which the mains voltage is first transformed down by using a transformer and is subsequently rectified. The rectified voltage then constitutes the supply voltage for the circuit. Second, the circuit may receive its power supply from a battery in which the battery voltage directly constitutes the supply voltage for the circuit.

A supply circuit of the type described in the opening paragraph by means of which a load circuit may optionally receive its power supply from the mains or from batteries, is used, for example, in the Philips Stereo Radio Cassette Recorder which is commercially available under type number D8437 at the time of filing the present Application.

Numerous electronic circuits require more than one supply voltage. An example is the so-called class-G amplifier for amplifying audio signals in which the supply voltage increases in a number of steps, for example, two steps, dependent on the magnitude of the input signal to be amplified. Viewed in time the signal level for audio signals is low on average, and is only high for short periods so that the amplifier is connected to the low supply voltage for the greater part of the time and only for short periods to the high supply voltage. In the case of battery supply of such an amplifier, this would mean that the battery supplying the low supply voltage is much more heavily loaded than the battery supplying the high supply voltage. One battery would thus get exhausted much sooner than the other battery. In that case a user might easily decide to replace both batteries, whereas only one of the batteries needs to be replaced. For this reason class-G amplifiers have not received their power supply from batteries so far.

A similar problem also occurs in portable compact disc players. The laser beam of the laser unit with which a compact disc is read is maintained focused on the disc by using a servo control. When the player is carried, incidentally large deviations of the disc relative to the laser unit may occur. The servo control is to supply a large current in those cases, whereas otherwise only a small current needs to be supplied. A high supply voltage is required for the large current and a low supply voltage is required for the small current. In the case of battery supply the battery supplying the low supply voltage would therefore become exhausted much sooner than the battery supplying the high supply voltage.

SUMMARY OF THE INVENTION

It is therefore an object of the invention to provide a power supply circuit which is suitable for generating at least two supply voltages which can optionally be derived from the mains or from batteries, which circuit obviates the above-mentioned problem.

A power supply circuit of the type described in the opening paragraph is characterized in that the circuit is suitable for supplying a second direct voltage which can be optionally derived from the alternating voltage of the mains voltage source or from the battery voltage of the at least one battery. The transformer for deriving the second direct voltage from the alternating voltage has a tertiary winding which is coupled to second rectifier means having a fifth and a sixth connection terminal for supplying the second direct voltage. The circuit for deriving the second direct voltage from the battery voltage is provided with a battery-voltage supplied inverter circuit comprising switching means for applying the battery voltage across at least substantially half the secondary winding during first periods so that a first voltage having a first polarity is present across the secondary winding. During second periods alternating with the first periods a second voltage which is at least substantially equal to the first voltage and has a second polarity opposed to the first polarity is present across the secondary winding. In the power supply circuit according to the invention, the batteries supplying the first direct voltage are also used to generate the second direct voltage. To this end the battery voltage is applied with a first polarity to the secondary winding by means of an inverter circuit during first periods and is not applied or is applied with an opposite polarity during second periods. As a result an alternating voltage is generated across the tertiary winding, which voltage, after rectification, yields the second direct voltage in the same manner as in the case of mains power supply.

The manner in which the inverter circuit may be constructed is related to the manner in which the voltages across the secondary and tertiary windings are rectified. In the case of halfwave rectification the power supply circuit according to the invention may be further characterized in that the first and the second rectifier means are each constituted by a halfwave rectifier, one end of the secondary winding of the first rectifier means being connected to the third connection terminal and the other end of the secondary winding being connected via a diode to the fourth connection terminal, the switching means being constituted by a first switch for directly connecting the other end of the secondary winding to the fourth connection terminal during the first periods.

In the case of fullwave rectification the power supply circuit according to a first embodiment may be further characterized in that the secondary and tertiary windings each have a center tap, in that the first and the second rectifier means are each constituted by a fullwave rectifier, the ends of the secondary winding being connected to the third connection terminal via a first and a second diode, respectively, and the center tap being connected to the fourth connection terminal, and in that the switching means are provided with a first switch for directly connecting one end of the secondary winding to the third connection terminal during the first periods, and with a second switch for directly connecting the other end of the secondary winding to the third connection terminal during the second periods.

According to a second embodiment, the power supply circuit may be further characterized in that the first and the second rectifier means are each constituted by a bridge rectifier, one end of the secondary winding being connected via a first and a second diode to the third and the fourth connection terminal, respectively, and the other end of the secondary winding being connected via a third and a fourth diode to the third and the fourth connection terminal, respectively, and in that the switching means are provided with a first and a second switch for connecting one end of the secondary winding to the third connection terminal and for connecting the other end of the secondary winding to the fourth connection terminal, respectively, during the first periods, and with a third and a fourth switch for connecting one end of the secondary winding to the fourth connection terminal and the other end of the secondary winding to the third connection terminal, respectively, during the second periods. For the case of symmetrical direct voltages the embodiment may be further characterized in that the secondary winding has a center tap which is connected to a seventh connection terminal, while a first direct voltage having a first polarity is available between the third and the seventh connection terminals and a first direct voltage having a second polarity opposed to the first polarity is available between the fourth and the seventh connection terminals, and in that the tertiary winding has a center tap which is connected to the seventh connection terminal, while a second direct voltage having a first polarity is available between the fifth and the seventh connection terminals and a second direct voltage having a second polarity opposed to the first polarity is available between the sixth and the seventh connection terminals.

The power supply circuit according to the invention may be further characterized in that the batteries are rechargeable, which batteries are charged in the case of connection to the mains voltage and in the no-load condition of the power supply circuit.

BRIEF DESCRIPTION OF THE DRAWINGS

The invention will be further described with reference to the accompanying drawing in which.

DESCRIPTION OF THE PREFERRED EMBODIMENTS

Figure 1:
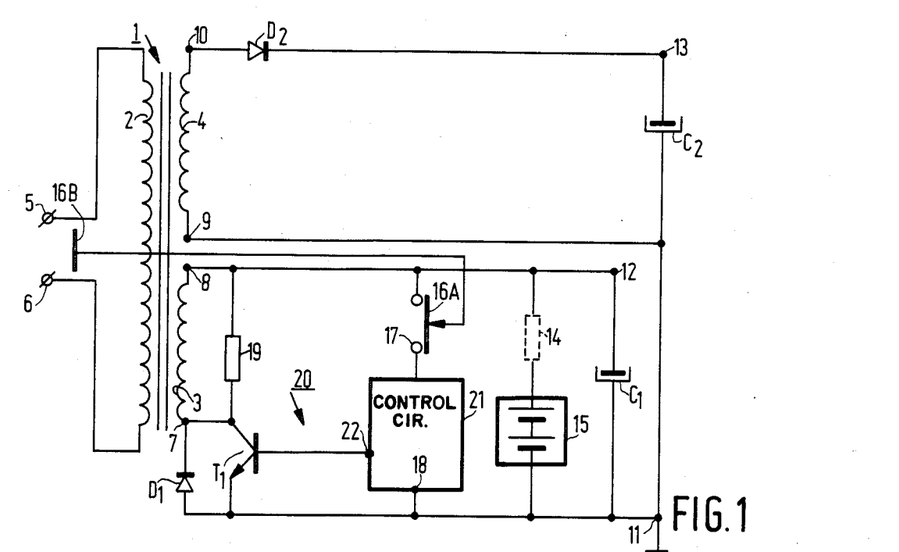
FIG. 1 shows a first embodiment of a power supply circuit according to the invention.

FIG. 1 shows a first embodiment of a power supply circuit according to the invention which can supply two different supply voltages which may be optionally derived from the mains voltage or from a battery voltage. The circuit comprises a transformer 1 having a primary winding 2 around a common core, a secondary winding 3 and a tertiary winding 4. The primary winding 2 has connection terminals 5 and 6 for connection to the mains voltage. One end 7 of winding 3 is connected by means of a diode $D_1$ to a grounded connection terminal 11 and the other end 8 of the winding 3 is connected to a connection terminal 12. A capacitor $C_1$ is arranged between the connection terminals 11 and 12. One end 9 of winding 4 is connected to the ground terminal 11 and the other end 10 is connected to connection terminal 13 by means of a diode $D_2$. A capacitor $C_2$ is arranged between the connection terminals 13 and 11.

A plurality of series-arranged batteries 15 whose positive pole is connected to connection terminal 12 and whose negative pole is connected to ground terminal 11 is provided in parallel with capacitor $C_1$ between the connection terminals 12 and 11. The total battery voltage is equal to $V_1$ volt in this example. The positive supply voltage connection 17 of an inverter circuit 20 can be connected to the positive pole of the battery 15 by using a switch 16 A. The other supply voltage connection 18 of the inverter circuit 20 is connected to ground terminal 11.

The switch 16A is mechanically connected to a contact 16B between the connection terminals 5 and 6. When connecting the mains voltage across the terminals 5 and 6, the switch 16A is opened, thus decoupling the positive pole of the battery 15 from the connection 17 so that the inverter circuit 20 is inoperative. Due to the mains voltage which is present across the primary winding 2, an alternating voltage is also present across the secondary winding 3. The diode $D_1$ constitutes a peak rectifier together with capacitor $C_1$ so that in the alternating voltage period in which the end 8 is positive relative to the end 7, capacitor $C_1$ is charged to the maximum value of the alternating voltage across the secondary winding 3. The winding ratio between the primary and secondary windings is chosen so that the voltage across the capacitor is then substantially equal to the battery voltage of $+V_1$ volt. Together with capacitor $C_2$, diode $D_2$ constitutes a peak rectifier for the alternating voltage across the tertiary winding so that capacitor $C_2$ is charged in the same manner to the maximum value of $+V_2$ volt of the alternating voltage across the tertiary winding 4. In this example the winding ratio between the primary and secondary windings 2 and 3 is larger than the winding ratio between the primary and tertiary windings 2 and 4, so that the second direct voltage $V_2$ is higher than the first direct voltage $V_1$. In this manner a first direct voltage of $+V_1$ volt can be derived from the connection terminals 12 and 11 and a second, higher direct voltage of $+V_2$ volt can be derived from the connection terminals 13 and 11 in the case of mains power supply.

If there is no mains power supply across the terminals 5 and 6, the battery voltage $+V_1$ of the battery 15 is present between the terminals 12 and 11. In addition, switch 16A is closed so that the battery voltage is also present across the inverter circuit 20. The inverter circuit 20 comprises a control circuit 21 whose output 22 generates clock pulses having a frequency of the order of the mains frequency. The control circuit 21 consists, for example, of an oscillator. The base of an npn transistor $T_1$ is connected to the output 22 and its collector is connected to the end 7 of winding 3 and the emitter is connected to ground terminal 11. In the case of a positive pulse at output 22, transistor $T_1$ is turned on so that the end 7 of winding 3 is substantially drawn to ground potential. The battery voltage $+V_1$ volt is then present across the secondary winding 3. Consequently, a voltage $+V_2$ volt is present between the ends 10 and 9 of the tertiary winding 4 so that capacitor $C_2$ is again charged to substantially the voltage $+V_2$ volt via diode $D_2$. In the case of a negative pulse at output 22, transistor $T_1$ is turned off so that the current through the secondary winding 3 is interrupted. The polarity of the voltage across this winding is then reversed. Diode $D_1$ is then cut off and prevents a current from starting to flow through the secondary winding 3. Consequently a voltage peak occurs across the secondary winding 3. This voltage peak also occurs across the tertiary winding 4. The diode $D_2$ is then cut off. To avoid damage to the batteries 15 and the further circuit elements owing to this voltage peak, a network 19, for example, constituted by the series arrangement of a diode and a zener diode may be provided across the secondary winding 3, which network reduces the magnitude of the occurring voltage peak. In the manner described above the second higher supply voltage $+V_2$ volt is derived from the battery supplying the first supply voltage $+V_1$ volt in the case of a battery power supply. The batteries 15 may also be rechargeable. In the no-load condition of the power supply circuit, the circuit may be used for charging the batteries when the mains voltage is connected between the connection terminals 5 and 6. The circuit may then be provided with a safety circuit 14, as is shown in broken lines in the Figure, which interrupts the charge current through the batteries when the battery is charged up or when too high a charge current occurs.

It is to be noted that in this embodiment the diode $D_1$ may alternatively be disposed between the end 8 and the connection terminal 12. The anode of diode $D_1$ should then be connected to the end 8. The diode $D_1$ can then be bridged by the collector-emitter path of a pnp transistor whose base is again to be connected to the output 22 of the control circuit 21.

Figure 2:
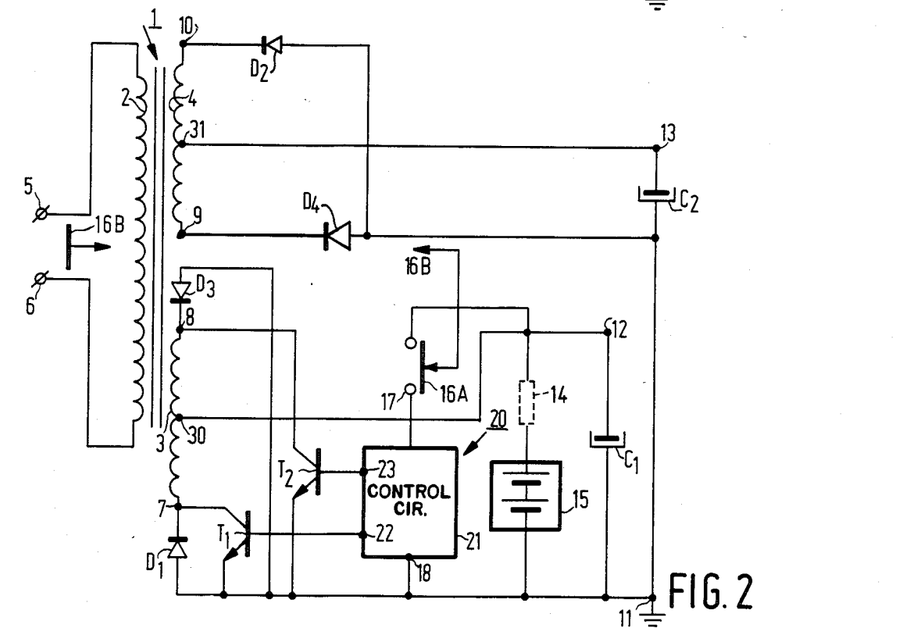
FIG. 2 shows a second embodiment of a power supply ciruit according to the invention.

FIG. 2 shows a second embodiment of a power supply circuit according to the invention in which the same components have the same reference numerals as those in FIG. 1. In this embodiment the alternating voltage across the windings 3 and 4 is fullwave rectified in the case of a mains power supply. The end 7 of the secondary winding 3 is again connected via a diode $D_1$ to ground terminal 11. The other end 8 is also connected to ground terminal 11 via a diode $D_3$, which is connected with a polarity opposed to that of diode $D_1$. Winding 3 has a center tap 30 which is connected to connection terminal 12. In the same manner the ends 9 and 10 of the tertiary winding 4 are connected via a diode $D_4$ and a diode $D_2$, respectively, to the ground terminal 11 and the center tap 31 of this winding is connected to connection terminal 13. In the case of a mains voltage across the terminals 5 and 6, capacitor $C_1$ is charged to the maximum value $+V_1$ volt of the voltage between the center tap 30 and the end 7 in the alternating voltage period when the end 8 is positive relative to the end 7. In the period when the end 8 is negative relative to the end 7, capacitor $C_1$ is charged to the same maximum value $+V_1$ volt by the voltage between the center tap 30 and the end 8. The voltage $+V_1$ across capacitor $C_1$ again constitutes the first direct voltage which is available between the terminals 12 and 11. In the same manner the alternating voltage across the tertiary winding 4 is fullwave rectified by means of the diodes $D_2$ and $D_4$, with capacitor $C_2$ being charged to a voltage $+V_2$ volt. This voltage again constitutes the second direct voltage which is available between the terminals 13 and 11.

When there is no mains voltage between the terminals 5 and 6, switch 16A is closed so that the battery voltage is present across the control circuit 21. The control circuit 21 has two outputs 22 and 23 at which positive and negative pulses are alternately generated. A positive pulse at output 22 renders an npn transistor $T_1$ conducting. The collector-emitter path of $T_1$ is arranged in parallel with diode $D_1$. The end 7 of winding 3 is therefore substantially at ground potential so that the battery voltage $+V_1$ volt is present between the center tap 30 and the end 7. A voltage of $+2V_1$ volt is then present across the entire secondary winding 3. Consequently a voltage of $+2V_2$ volt is present across the tertiary winding 4. Capacitor $C_2$ is then charged to a voltage $+V_2$ volt which is present between the central tap 31 and the end 9.

At the next positive pulse at output 23 an npn transistor $T_2$ is turned on and its collector is connected to the end 8 and its emitter is connected to ground terminal 11. Consequently the end 8 is switched to substantially 0 volt. Simultaneously transistor $T_1$ is turned off so that the current through the secondary winding 3 is interrupted. The polarity of the voltage across the winding 3 is therefore reversed so that the end 7 is switched to a voltage $+2V_1$. The polarity of the voltage across the tertiary winding 4 is thus also reversed so that the end 10 of this winding is switched to a voltage $-2V_2$. Capacitor $C_2$ is thereby charged to a voltage $+V_2$ which is then present between the central tap 31 and the end 10. In this manner capacitor $C_2$ is again charged to the second direct voltage $+V_2$ volt in the case of a battery power supply.

Figure 3:
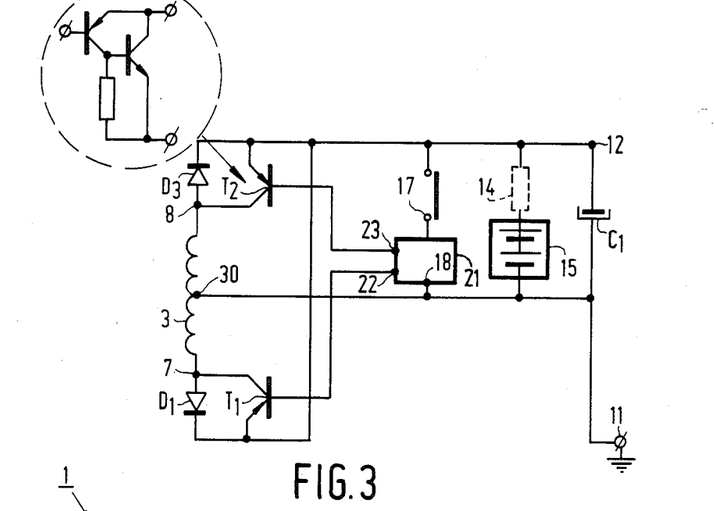
FIG. 3 shows a variant of the circuit of FIG. 2.

FIG. 3 shows a variant of the circuit of FIG. 2 in which only the relevant components are shown. The end 8 is connected via a diode $D_3$ and the end 7 of winding 3 is connected via a diode $D_1$ to the positive pole of the battery 15 and the central tap 30 is connected to ground terminal 11. With respect to the diodes shown in FIG. 2, the diodes $D_1$ and $D_3$ have reversed polarities. The transistors $T_1$ and $T_2$ are now pnp transistors. These pnp transistors may also be replaced by composite transistors as is shown in broken lines in the Figure. Otherwise, the operation of the circuit is the same as that of FIG. 2.

Figure 4:
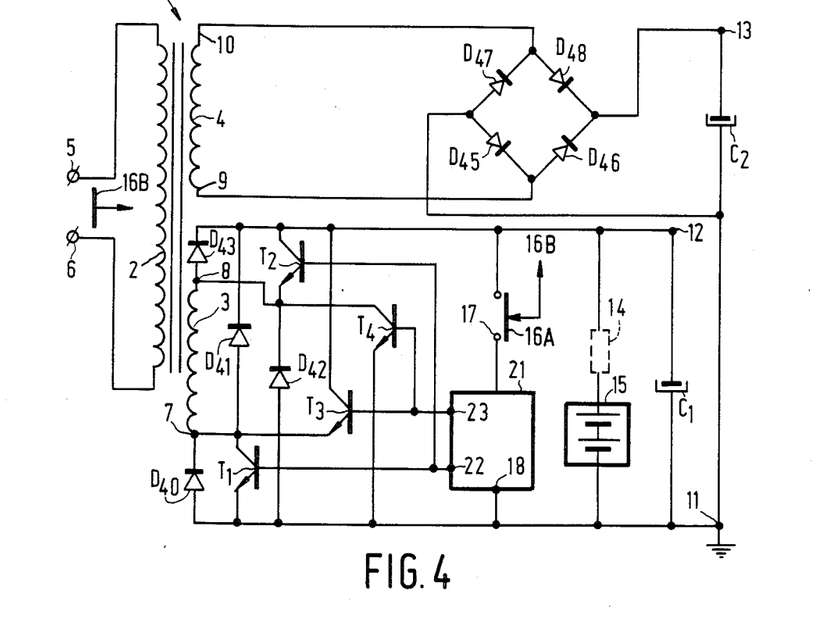
FIG. 4 shows a third embodiment of a power supply circuit according to the invention.

FIG. 4 shows a third embodiment of a power supply circuit according to the invention. The same components have the same reference numerals as those in FIG. 1. As in the embodiment of FIG. 2, there is fullwave rectification. However, rectification is now effected by a bridge circuit. In this case the windings 3 and 4 do not have a central tap. The bridge circuit for winding 3 is constituted by the diodes $D_{40}$ through $D_{43}$. The end 7 of winding 3 is connected to ground terminal 11 by means of diode $D_{40}$ and to connection terminal 12 by means of diode $D_{41}$. The other end 8 is connected to ground terminal 11 by means of diode $D_{42}$ and to connection terminal 12 by means of diode $D_{43}$. In the alternating voltage period when the end 8 of winding 3 is positive relative to the end 7, the capacitor is charged to the maximum value of $+V_1$ volt of the voltage across winding 3 via the diodes $D_{43}$ and $D_{40}$. In the period when the end 8 is negative relative to the end 7, capacitor $C_1$ is also charged to the maximum value of $+V_1$ volt of the voltage across the winding 3 via the diodes $D_{41}$ and $D_{42}$. The voltage $+V_1$ across capacitor $C_1$ again constitutes the first direct voltage which is available between the terminals 12 and 11. Similarly, a rectifier bridge consisting of diodes $D_{45}$ through $D_{48}$ is arranged between the ends 9 and 10 of the tertiary winding 4, with which bridge capacitor $C_2$ is charged to the maximum value of $+V_2$ volt of the voltage across winding 4. This voltage across capacitor $C_2$ constitutes the second direct voltage which is available between the terminals 13 and 11.

When there is no mains voltage between the terminals 5 and 6, switch 16A is closed and the battery voltage $+V_1$ volt is present across the inverter circuit 20. The inverter circuit 20 comprises an npn transistor $T_1$ whose collector-emitter path is arranged between the end 7 and ground terminal 11, and an npn transistor $T_2$ whose collector-emitter path is arranged between the end 8 and connection terminal 12. Furthermore the circuit comprises an npn transistor $T_3$ whose collector-emitter path is arranged between connection terminal 12 and the end 7, and an npn transistor $T_4$ whose collector-emitter path is arranged between the end 8 and the ground terminal 11. The bases of transistors $T_1$ and $T_2$ are connected to the output 22 and the bases of transistors $T_3$ and $T_4$ are connected to the output 23 of the control circuit 21. With a positive pulse at output 22 transistors $T_1$ and $T_2$ are turned on so that the end 7 is switched to zero volt and the end 8 is switched to the battery voltage $+V_1$. The voltage $+V_2$ volt is then present across the tertiary winding 4 so that capacitor $C_2$ is charged to substantially this voltage via the diodes $D_{48}$ and $D_{45}$. With a positive pulse at output 23, transistors $T_3$ and $T_4$ are turned on so that the end 8 is switched to 0 volt and the end 7 is switched to $+V_1$ volt. The polarity of the voltage across the secondary winding 3 is thus reversed so that the polarity of the voltage across the tertiary winding 4 is also reversed. Consequently capacitor $C_2$ is charged to substantially the voltage $+V_2$ via the diodes $D_{46}$ and $D_{47}$. It is to be noted that the npn transistors $T_2$ and $T_3$ in this embodiment may be replaced by pnp transistors.

Figure 5:
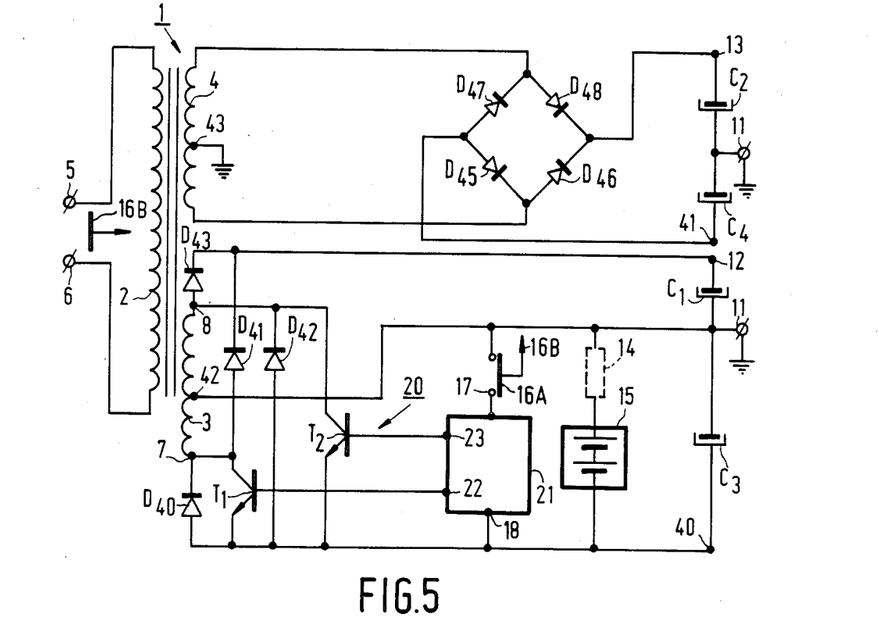
FIG. 5 shows a fourth embodiment of a power supply circuit according to the invention.

FIG. 5 shows a fourth embodiment of a power supply circuit according to the invention in which the same components have the same reference numerals as those in FIG. 4. Two symmetrical supply voltages can be generated with this power supply circuit. The winding 3 has a central tap 42 which is connected to ground terminal 11. The end 7 of the winding 3 is connected to a connection terminal 40 by means of a diode $D_{40}$ and to connection terminal 12 by means of a diode $D_{41}$. The end 8 is connected to connection terminal 40 by means of a diode $D_{42}$ and to connection terminal 12 by means of a diode $D_{43}$. A capacitor $C_1$ is again arranged between the connection terminals 12 and 11 and a capacitor $C_3$ is arranged between the connection terminals 11 and 40. In the alternating voltage period when the end 8 is positive relative to the end 7, capacitors $C_1$ and $C_3$ are each charged to half the maximum voltage $+2V_1$ volt across winding 3 via the diodes $D_{40}$ and $D_{43}$, whereas in the alternating voltage period when the end 8 is negative relative to the end 7, the capacitors $C_1$ and $C_3$ are charged to this voltage via diodes $D_{41}$ and $D_{42}$. The voltage across capacitor $C_1$ constitutes the positive direct voltage $+V_1$ which is available between the terminals 12 and 11, whereas the voltage across capacitor $C_3$ constitutes the negative direct voltage $-V_1$ which is available between the terminals 40 and 11.

The winding 4 also has a central tap 43, and a bridge rectifier including diodes $D_{45}$ through $D_{48}$ is arranged between the ends 10 and 9. Two capacitors $C_2$ and $C_4$, which are connected to ground terminal 11, are arranged between the ouputs 13 and 41. Similarly, as described above, capacitor $C_2$ is charged to a positive voltage $+V_2$ which is available between the terminals 13 and 11, and capacitor $C_4$ is charged to a negative voltage $-V_2$ which is available between the terminals 41 and 11.

When there is no mains voltage across the connection terminals 5 and 6, the battery voltage $-V_1$ is present between the terminals 40 and 11. The end 7 of winding 3 is connected to terminal 40 by means of the collector-emitter path of the transistor $T_1$ and the other end 8 is connected to terminal 40 by means of the collector-emitter path of the transistor $T_2$. The bases of transistors $T_1$ and $T_2$ are again connected to the outputs 22 and 23 of the control circuit 21. With a positive pulse at output 22, transistor $T_1$ is turned on so that the end 7 is switched to 0 volt. The battery voltage $+V_1$ volt is then present between the central tap 42 and the end 7. This voltage is also present between the end 8 and central tap 42. Consequently, a voltage $+2V_1$ is present across the entire winding 3. A voltage $+2V_2$ is therefore present across the tertiary winding 4 so that capacitors $C_2$ and $C_4$ are each charged to a voltage $+V_2$ volt again. With a positive pulse at output 23, transistor $T_2$ is turned on and transistor $T_1$ is turned off. The polarity of the voltage across the winding 3 is thereby reversed so that the end 7 is switched to $+V_1$ because end 8 is switched to $-V_1$ volt by transistor $T_2$. Consequently a voltage $-2V_1$ volt is present between the end 8 and the end 7. A voltage $-2V_2$ volt is then present between the ends 10 and 9 of the tertiary winding so that the capacitors $C_2$ and $C_4$ are each charged to a voltage $+V_2$ volt again.

Figure 6:
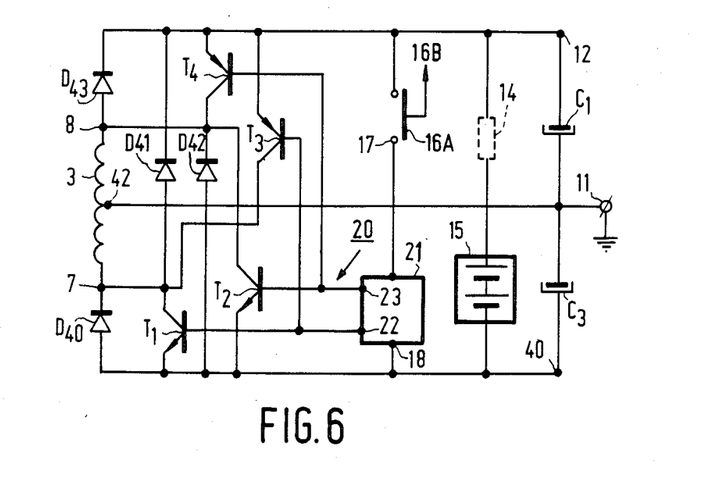
FIG. 6 shows a variant of the circuit of FIG. 5.

FIG. 6 shows a variant of the circuit of FIG. 5 in which only the part with the secondary winding 3 is shown. In this case the battery 15 is arranged between terminals 12 and 40 so that a voltage $+V_1$ is again present across capacitor $C_1$ between the terminals 12 and 11 and a voltage $-V_1$ is present across capacitor $C_3$ between the terminals 40 and 11. In addition to npn transistors $T_1$ and $T_2$ the inverter circuit 20 furthermore comprises two pnp transistors $T_3$ and $T_4$ with the collector-emitter path of transistor $T_3$ arranged between the end 7 and terminal 12 and the collector-emitter path of transistor $T_4$ arranged between the end 8 and terminal 12. With a positive pulse at output 22 (and hence a negative pulse at output 23) transistors $T_1$ and $T_4$ are turned on so that the battery voltage $+V_1$ is present across the winding 3 (between the ends 8 and 7). The voltage $+V_2$ is again present across the tertiary winding 4 (between the ends 10 and 9) so that capacitors $C_2$ and $C_4$ are charged again. With a positive pulse at output 23 and a negative pulse at output 22 transistors $T_2$ and $T_3$ are turned on so that the polarity of the voltage across winding 3 is reversed. The polarity of the voltage across winding 4 is then also reversed so that a voltage $-V_2$ is present between the ends 10 and 9.

Figure 7:
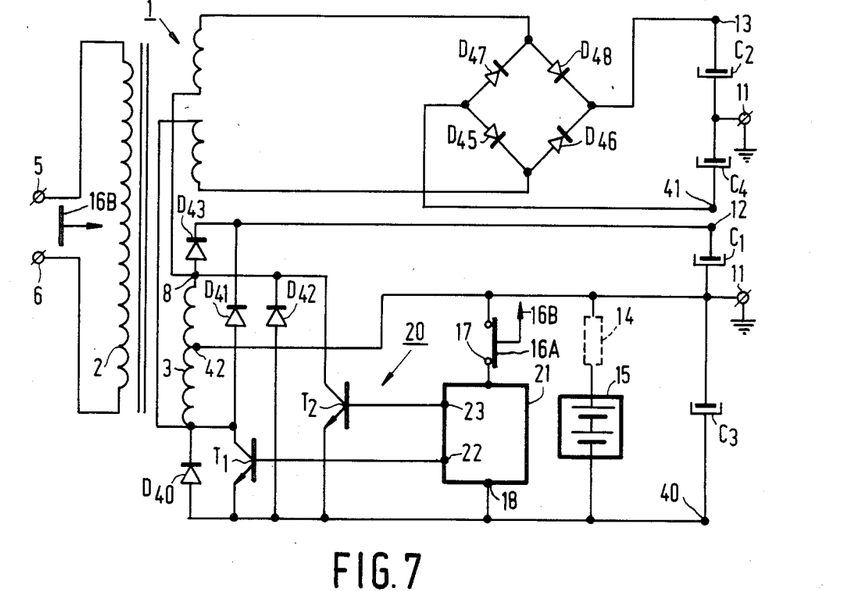
FIG. 7 shows a fifth embodiment of a power supply circuit according to the invention.

FIG. 7 shows a fifth embodiment of a power supply circuit according to the invention in which the same components have the same reference numerals as those in FIG. 5. It differs from the circuit of FIG. 5 in that the windings 3 and 4 constitute one common winding having one common central tap 42. The operation of the circuit is otherwise equal to that of FIG. 5. It is to be noted that the winding 3 also may form part of the winding 4 in the circuits of FIGS. 1, 2, 3 and 4.

It is to be noted that the batteries may also be rechargeable in the embodiments of FIGS. 2 through 7, which batteries may be charged by means of the mains voltage in the no-load condition of the power supply circuit.

Figure 8:
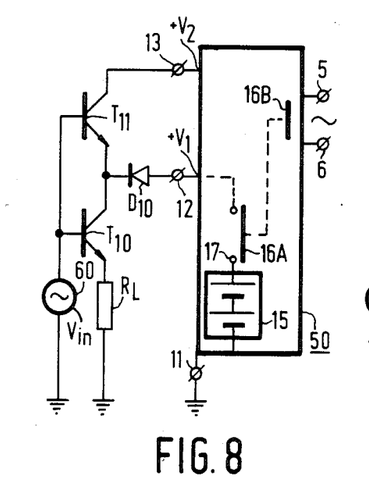
FIG. 8 shows a class-G amplifier with a power supply circuit according to the invention.

FIG. 8 shows a class-G amplifier in combination with a power supply circuit according to the invention. Only the principle circuit diagram of the class-G amplifier is shown. The amplifier comprises two series-arranged transistors $T_{10}$ and $T_{11}$. The emitter of transistor $T_{10}$ is connected to ground potential via a load resistor $R_L$. The collector of transistor $T_{10}$ is connected by means of a diode $D_{10}$ to the supply voltage terminal 12 of a power supply circuit 50 conveying a voltage $+V_1$. The collector of transistor $T_{11}$ is connected to the supply voltage terminal 13 of power supply circuit 50 conveying a voltage $+V_2$ which is higher than the voltage $+V_1$. The power supply circuit 50 is an asymmetrical power supply circuit as described with reference to FIGS. 1, 2 and 3 in which the direct voltages $+V_1$ and $+V_2$ can be derived both from the mains voltage and from the battery voltage. The bases of transistors $T_{10}$ and $T_{11}$ are connected to the signal source 60 supplying the input voltage $V_{in}$.

At an input voltage $V_{in}$ which is smaller than the voltage $+V_1$, transistor $T_{11}$ is turned off and the collector of transistor $T_{10}$ is connected to the voltage $+V_1$ via diode $D_{10}$. At input voltages $V_{in}$ which are higher than the voltage $+V_1$, transistor $T_{11}$ is turned on and diode $D_{10}$ is cut off. The collector of transistor $T_{10}$ is then connected to the voltage $+V_2$ via transistor $T_{11}$. If the input signal $V_{in}$ is an audio signal, transistor $T_{10}$ will be connected to the low supply voltage $+V_1$ for the greater part of the period and only for short periods to the high supply voltage $+V_2$. The power supply circuit 50 is an advantage in this case because the two direct voltages $V_1$ and $V_2$ are derived from the same batteries in the case of battery power supply so that, compared with the situation where these voltages are derived from separate batteries, an unequal load on the batteries is prevented from occurring.

Figure 9:
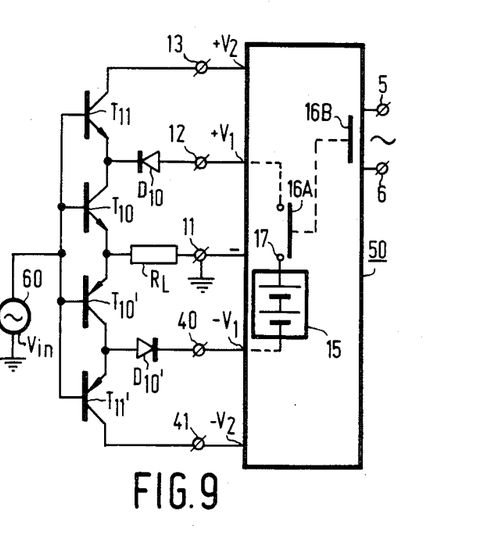
FIG. 9 shows a class-G push-pull amplifier with a power supply circuit according to the invention.

FIG. 9 shows a class-G push-pull amplifier in combination with a symmetrical power supply circuit of the type described with reference to FIGS. 5, 6 and 7. The push-pull amplifier comprises two complementary circuits each being constructed in the same manner as the circuit of FIG. 8. The same components have therefore been denoted by the same reference numerals as those in FIG. 8, with the complementary components being denoted by primed reference numerals. The emitters of the complementary transistors $T_{10}$ and $T'_{10}$ are connected to a common load $R_L$. The principle of the push-pull operation is known per se and does not require any further explanation in this description.

The invention is not limited to the embodiments shown. The manner in which rectification and smoothing of the alternating voltage across the two secondary windings is effected is irrelevant to the principle of the invention. Thus, the capacitors may be replaced by, for example, RC or LC networks. Furthermore, the inverter circuit for converting the direct voltage of the batteries into an alternating voltage may be formed in other ways than the manner shown. In the embodiments shown the battery voltage is equal to the lowest direct voltage and the higher direct voltage is derived therefrom. In principle it is also possible to choose the battery voltage to be equal to the highest direct voltage and to derive the lowest direct voltage therefrom. In the embodiments shown two direct voltages are generated each time. However, the invention is not limited thereto. The power supply circuits may be extended in a simple manner for generating more direct voltages.

Furthermore, the switch-over from mains power supply to battery power supply may be effected in other ways than the manner shown, for example, electronically.

What is claimed is:

1. A power supply circuit for supplying at least a first direct voltage optionally derived from the alternating voltage of a mains voltage source or from the battery voltage of at least one battery, said power supply circuit comprising: a circuit for deriving the first direct voltage from the alternating voltage including a transformer comprising at least a primary winding having a first and a second connection terminal for connection to the alternating voltage and a secondary winding coupled to first rectifier means, third and fourth connection terminals coupled to the secondary winding via said first rectifier means for deriving the first direct voltage at said third and fourth connection terminals, a circuit for deriving the first direct voltage from the battery voltage comprising means for connecting the battery between the third and fourth connection terminals, the power supply circuit producing a second direct voltage optionally derived from the alternating voltage of the mains voltage source or from the battery voltage of the at least one battery, the transformer having a tertiary winding for deriving the second direct voltage from the alternating voltage, means coupling the tertiary winding to second rectifier means, fifth and sixth connection terminals coupled to the tertiary winding via said second rectifier means for deriving the second direct voltage at said fifth and sixth connection terminals, and a circuit for deriving the second direct voltage from the battery voltage which includes a battery-voltage supplied inverter circuit comprising switching means for applying the battery voltage across at least a part of the secondary winding during first periods so that a first voltage having a first polarity is developed across the secondary winding, and during second periods alternating with the first periods a second voltage which is at least substantially equal to the first voltage and has a second polarity opposed to the first polarity is developed across the secondary winding.

2. A power supply circuit as claimed in claim 1, wherein the first and second rectifier means each comprise a halfwave rectifier, one end of the secondary winding being connected to the third connection terminal and the other end of the secondary winding being connected via a diode to the fourth connection terminal, the switching means comprising a first switch for directly connecting the other end of the secondary winding to the fourth connection terminal during the first periods.

3. A power supply circuit as claimed in claim 1, wherein the secondary and tertiary windings each have a central tap, and the first and the second rectifier means each comprise a fullwave rectifier, the ends of the secondary winding being connected to the third connection terminal via a first and a second diode, respectively, of the fullwave rectifier of the first rectifier means, the central tap of the secondary winding being connected to the fourth connection terminal, and wherein the switching means comprise a first switch for directly connecting one end of the secondary winding to the third connection terminal during the first periods and a second switch for directly connecting the other end of the secondary winding to the third connection terminal during the second periods.

4. A power supply circuit as claimed in claim 1 wherein the first and the second rectifier means each comprise a bridge rectifier, one end of the secondary winding being connected to the third and fourth connection terminals via a first and a second diode, respectively, of the bridge rectifier of the first rectifier means, the other end of the secondary winding being connected via a third and a fourth diode of said bridge rectifier to the third and the fourth connection terminal, respectively, and the switching means comprise a first and a second switch for connecting one end of the secondary winding to the third connection terminal and for connecting the other end of the secondary winding to the fourth connection terminal, respectively, during the first periods, and a third and a fourth switch for connecting the one end of the secondary winding to the fourth connection terminal and the other end of the secondary winding to the third connection terminal, respectively, during the second periods.

5. A power supply circuit as claimed in claim 4, wherein the secondary winding includes a central tap connected to a seventh connection terminal, whereby a first direct voltage having a first polarity is available between the third and the seventh connection terminal and a first direct voltage having a second polarity opposed to the first polarity is available between the fourth and the seventh connection terminal, and wherein the tertiary winding includes a central tap connected to the seventh connection terminal, whereby a second direct voltage having a first polarity is available between the fifth and the seventh connection terminal and a second direct voltage having a second polarity opposed to the first polarity is available between the sixth and the seventh connection terminal.

6. A power supply circuit as claimed in claim 5, wherein the at least one battery is connected between the third and the seventh connection terminal.

7. A power supply circuit as claimed in claim 1 wherein one winding of the secondary and tertiary windings is constituted by a fraction of the other winding.

8. A power supply circuit as claimed in claim 1, wherein the battery is rechargeable, and is charged in the case of connection to the mains voltage and in the no-load condition of the power supply circuit.

9. A power supply circuit as claimed in claim 1 in combination with a class-G amplifier comprising at least a first and a second transistor connected in series, said first transistor being coupled to a first connection point for connection to a first supply voltage and being also coupled to a second connection point for connection to a load, said second transistor being coupled to a third connection point for connection to a second supply voltage, wherein the power supply circuit supplies the first and the second supply voltage to the first and third connection points.

10. A power supply circuit as claimed in claim 5 in combination with a class-G amplifier comprising a first amplifier circuit and a second amplifier circuit complementary thereto, said first amplifier circuit comprising at least a first and a second transistor connected in series, the first and the second transistor being coupled to a first connection point for connection to a first positive supply voltage and to a second connection point for connection to a second positive supply voltage, respectively, said second amplifier circuit comprising at least a third transistor and a fourth transistor arranged in series, the third and the fourth transistor being coupled to a third connection point for connection to a first negative supply voltage and to a fourth connection point for connection to a second negative supply voltage, respectively, said first and third transistors being furthermore connected to a common point for connecting a common load, wherein the power supply circuit supplies the first and the second positive supply voltage and the first and the second negative supply voltage to the first and second and third and fourth connection points respectively.

11. A power supply circuit for producing first and second DC supply voltages comprising:
a transformer comprising a primary winding having first and second terminals for connection to a source of AC voltage and a secondary winding and a tertiary winding,
third and fourth terminals for supplying said first DC supply voltage and fifth and sixth terminals for supplying said second DC supply voltage,
first and second rectifier means coupling said third and fourth terminals and said fourth and fifth terminals, respectively, to said secondary and tertiary windings, respectively,
means for coupling a battery to said third and fourth terminals, and
an inverter circuit energized by said battery, said inverter circuit including switching means for coupling the battery voltage to a part of the secondary winding during first time periods so as to generate in the tertiary winding a first voltage of one polarity and, during second timer periods alternating with the first time periods, generating in the tertiary winding a second equal voltage but of opposite polarity to the first voltage.

12. A power supply circuit as claimed in claim 11 further comprising second switching means for selectively coupling at least one of said first and second terminals to the source of AC voltage and for selectively coupling the battery to the inverter circuit in mutually exclusive time periods.

13. A power supply circuit as claimed in claim 11 wherein said windings of the transformer have a turns ratio such that said first and second DC voltages have different values.

14. A power supply circuit as claimed in claim 13 wherein said turns ratio is chosen so that the second DC voltage has approximately the same value when it is generated in response to application of the AC voltage to the primary winding as when it is generated by application of the battery voltage to the secondary winding by means of said inverter circuit.

15. A power supply circuit as claimed in claim 11 wherein the inverter circuit is energized by the battery independently of any voltage in the tertiary winding.

* * * * *